United States Patent [19]
Rich et al.

[11] Patent Number: 5,433,832
[45] Date of Patent: Jul. 18, 1995

[54] EXHAUST TREATMENT SYSTEM AND METHOD

[75] Inventors: Stanley R. Rich, deceased, late of Grantham, N.H., by Shirley C. Rich, executrix; Alvaro Kaplan, Framingham; Michael P. Manning, Nahant, both of Mass.

[73] Assignee: ENOX Technologies, Inc., Natick, Mass.

[21] Appl. No.: 192,917

[22] Filed: Feb. 7, 1994

Related U.S. Application Data

[63] Continuation-in-part of Ser. No. 694,090, May 1, 1991, Pat. No. 5,284,556.

[51] Int. Cl.⁶ .......................... B01J 19/08; H05F 3/04
[52] U.S. Cl. .................... 204/164; 204/179; 422/186.21; 422/186.2
[58] Field of Search .............................. 204/164, 179; 422/186.21, 186.3

[56] References Cited

U.S. PATENT DOCUMENTS

| | | | |
|---|---|---|---|
| 4,507,266 | 3/1985 | Satoh et al. | 204/176 |
| 5,062,936 | 11/1991 | Beaty et al. | 204/164 |
| 5,147,516 | 9/1992 | Mathur et al. | 204/179 |
| 5,284,556 | 2/1994 | Rich | 204/164 |

*Primary Examiner*—John Niebling
*Assistant Examiner*—Kishor Mayeuar
*Attorney, Agent, or Firm*—Alan R. Loudermilk

[57] ABSTRACT

A moving fluid containing pollutants including NOx compounds is subjected to a relatively low-power alternating-current dielectric discharge for a relatively long time duration. In this manner, pollutants are oxidized and dissociated while the temperature of the fluid is kept low enough to prevent the formation of new NOx pollutants.

16 Claims, 3 Drawing Sheets

EXHAUST TREATMENT SYSTEM AND METHOD

This is a continuation-in-part of application Ser. No. 07/694,090, filed on May 1, 1991, now U.S. Pat. No. 5,284,556.

FIELD OF THE INVENTION

This invention relates to an apparatus and method for reducing polluting substances such as NOx, hydrocarbons and carbon monoxide emissions in a fluid such as an exhaust gas or stack gas.

BACKGROUND OF THE INVENTION

Polluting agents in exhaust gases generated by internal combustion engines and in stack gases generated by power plants burning fossil fuels have seriously degraded air quality in many locations and created acid rain, smog and a host of other environmental problems. Two pollution components commonly found in exhaust and stack gases are nitrogen compounds such as nitric oxide and nitrogen dioxide (collectively called NOx), carbon monoxide and various hydrocarbon compounds which result from incomplete or imperfect combustion of the fossil fuels. Although these components are known to cause pollution problems, recent attention has focused on NOx compounds which are in part responsible for acid rain. Attempts to control, reduce or eliminate the pollutants in exhaust gases have included mechanical, electrical and chemical apparatus.

One known method of reducing pollutants is by means of chemical apparatus such as catalytic converters. Such devices are typically used with internal combustion engines such as those found in automobiles. In a catalytic converter system, engine exhaust gases are mixed with air and the mixture then passes through a catalyst bed. In the catalyst bed, pollutants in the exhaust gas react with the air in the mixture to produce more complete combustion. Such devices have drawbacks. For example, they restrict the exhaust gas flow and therefore increase the exhaust back-pressure on the internal combustion engine, resulting in reduced efficiency and fuel economy. Further, the catalyst must be replaced at regular intervals to maintain conversion efficiency, thus increasing maintenance expense. In addition, such catalytic converters are not known to efficiently reduce NOx pollutants. Consequently, additional techniques are generally used in conjunction with the converter systems to reduce NOx pollutants. These additional techniques generally take the form of recirculating a portion of the engine exhaust gases through the engine to reduce combustion temperatures. However, these additional techniques further reduce fuel efficiency and economy and require additional equipment.

Other proposals to reduce pollution to a satisfactory level have involved the application of electric fields to the pollutant-containing exhaust gas. Such proposals involve mixing air with the exhaust gases, and then subjecting the mixture to an electric field which may take the form of a spark, an electric arc, electric plasma, a corona or a silent discharge. The electric field must be sufficiently intense and of sufficient duration to create active species such as free radicals, ionic species, ion-radicals, metastable neutral species and very reactive molecules such as ozone within the exhaust gas which then react with the pollutants to dissociate the compounds or to form harmless compounds. Two attempts to use electrical discharge to reduce pollutants are shown in U.S. Pat. Nos. 3,188,167 and 3,979,193.

Previously known electrical devices appear to have additional drawbacks. First, because of the intense electric field used in such devices, oxidation of nitrogen may actually increase the amount of NOx pollutants. Second, due to their construction, such devices typically increase exhaust back pressure, thereby reducing fuel economy and efficiency. Moreover, the addition of secondary air requires an air compressor, and this is a disadvantage because of the additional energy consumed.

It is an object of the present invention to provide a simple, efficient and economical exhaust gas treatment system in which exhaust gases are treated with a specially selected electric discharge to reduce harmful pollutants such as carbon monoxide, hydrocarbon and NOx emissions without producing significant back pressure in the exhaust system.

SUMMARY OF THE INVENTION

A method and apparatus are disclosed in which exhaust gases are passed through a treatment chamber and subjected to a relatively low-power alternating-current dielectric discharge for a selected time duration. The dielectric discharge, also known as a "silent discharge," is a capacitive discharge between electrodes, at least one of which is insulated. As a result, there can be no sparks or arcing between the electrodes. The discharge comprises the movement back and forth between the electrodes of a cloud of electrons and ions that impact or slam into other molecules, dissociating those that are easiest to disrupt. Because of the fact that all nitrogen oxide gases have negative heats of formation, except at extremely high temperatures (982° C. (1800° F.) or above), and hence are thermodynamically unstable at most exhaust line or stack gas temperatures (e.g., 100° to 950° C.), these materials will be the easiest to dissociate.

A silent discharge is more efficient for ionizing gases than other forms of electrical discharge such as electric arcs, microwave or radio frequency plasmas. Moreover, a silent discharge is readily established essentially at any pressure from extremely low (less than one tort) to extremely high (many atmospheres). Accordingly, the placement of an appropriate array of alternately conductive and insulated electrodes in a gas stream will dissociate the nitrogen oxides in the stream. Additionally, the liberated monatomic oxygen will then oxidize any incompletely burned compounds in that stream.

In one embodiment of the invention, the dielectric discharge occurs between a first electrode encased in a dielectric and the chamber wall itself, which functions as a second electrode. In this manner, pollutants are oxidized and others are dissociated while the temperature of the exhaust gas is kept low enough to prevent the formation of new NOx pollutants. The addition of secondary air is not required with the invention disclosed herein.

The discharge voltage is adjusted so that the temperature of the exhaust gas when increased in temperature by the electrical discharge nevertheless remains in a temperature region in which the heat of formation of nitrogen oxides is negative. This prevents new nitrogen compounds from being created by the discharge. The length of the treatment chamber is selected so that the exhaust gas remains in the electric discharge for a length of time suitable to dissociate the nitrogen compounds and oxidize carbon monoxide and hydrocarbons

DETAILED DESCRIPTION OF THE INVENTION

Figure 1:
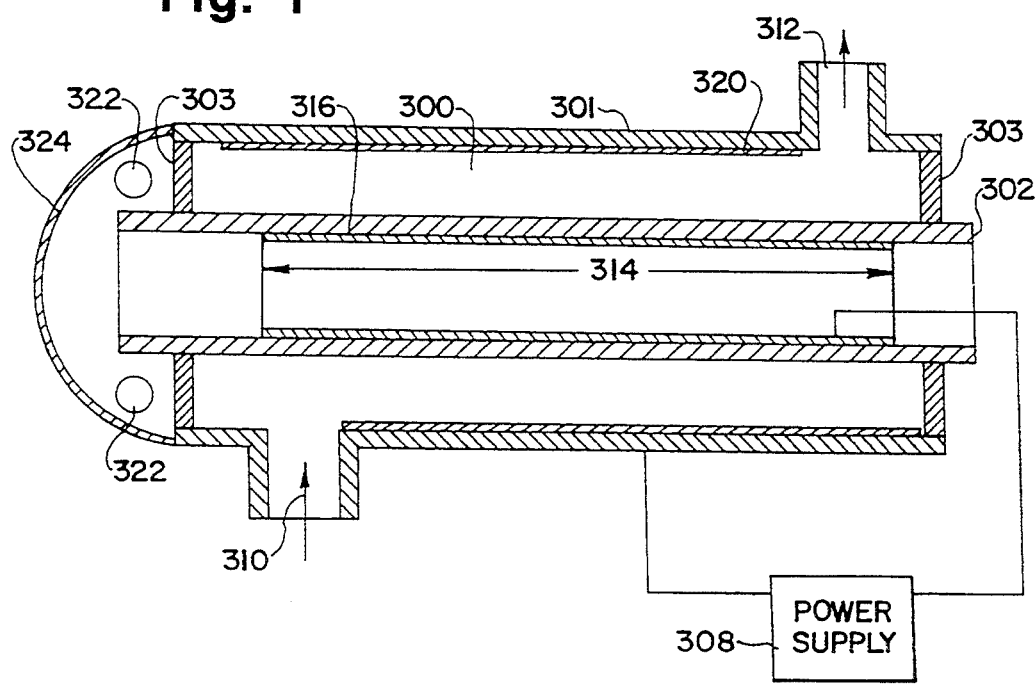
FIG. 1 shows an illustrative exhaust treatment chamber for applying a dielectric discharge to a fluid such as exhaust gas.

Referring to FIG. 1, one embodiment of the present invention is disclosed and described in which gaseous fluids such as exhaust gases are treated by subjecting them to a dielectric discharge. Treatment chamber 300 is a closed chamber which, illustratively, is cylindrical but may have other cross-section. A silent discharge reactor useful in the present invention may be constructed with electrodes that are annular in geometry as shown in FIG. 1. In other embodiments, the reactor may have electrodes that are alternating parallel plates. Referring again to FIG. 1, the longitudinal wall 301 of chamber 300 is made of a conductive material such as steel. The ends 303 may be of the same material as wall 301, or may be another material such as fused quartz. The fluid or gas to be treated enters chamber 300 via an inlet port 310 and exits via an outlet port 312. Ports 310 and 312 will typically be of the same material as wall 301, although this is not a requirement. The precise locations of the inlet and outlet ports are not critical to the invention, but for illustration are located towards the end of the chamber 300 so that the fluid or gas enters the chamber perpendicularly to the axis of the chamber. As shown, the cross-section of chamber 300 is constant throughout its entire length so that the chamber does not cause a significant back pressure on the gas passing through it. Such a chamber may illustratively be mounted in the exhaust pipe of an internal combustion engine or in the exhaust stack of a fossil fuel power plant. The chamber may also be mounted in a muffler system. The diameter of the chamber can be adjusted to accommodate the volume of gas passing through it.

Mounted within chamber 300, preferably along its central axis, in one embodiment, is a tubular insulator structure 302. In order for a dielectric discharge to occur and to prevent arcing, the insulator structure 302 should remain an insulator over the entire operating temperature range of treatment chamber 300 which, if the chamber is used to treat exhaust gas generated by an internal combustion engine, for example, may be in the range of 649° C. (1200° F.). Thus, the materials used to fabricate tubular structure 302 should not be of the type which are insulators at room temperature but which become conductive at higher temperatures. In particular, the bulk resistivity of the insulator structure 302 should remain greater than $10^9$ ohm-cm throughout the operating temperature range. Such materials as fused quartz and boron nitride have been found to be satisfactory for insulator 302.

To create an electric discharge within the chamber, two electrodes are necessary. One electrode is formed by the conductive chamber 300 itself. The second electrode 316 is formed on the inside surface of tubular structure 302. In one embodiment, for illustration, silver is deposited on the inside surface of structure 302. In another embodiment, a liquid electrode can be created by filling the tubular structure 302 with an electrically conductive liquid such as a molten metal, or an inorganic or organic liquid salt or salt solution or other liquid electrolyte, such as an acid solution such as sulfuric or acetic acid in water.

A high-voltage alternating current power supply 308 is connected between the chamber wall 300 and electrode 316. The voltage generated by power supply 308 is adjusted to initiate and maintain a dielectric discharge between electrode 316 and wall 300.

The electrical discharge will cause heating of the gas passing through it. In accordance with the invention, however, the temperature rise produced in the treated gas by the discharge is reduced so that the overall temperature of the gas will remain in the temperature region where the heat of formation of nitrogen oxides is negative, and hence would be thermodynamically unstable. At temperatures above this region, nitrogen oxides (NOx) will increase. This is accomplished by subjecting the treated gas to a relatively low intensity discharge over a long time period rather than applying an intense discharge over a short time period as has been previously done. The active length 314 of chamber 300 and the frequency of high-voltage power supply 308 should be adjusted based on the flow velocity of the fluid through the chamber so that the fluid is subjected to a plurality of discharge cycles before completely passing through the chamber.

For example, above 871° C. (from about 1600° to 1800° F.), the heat of formation of polluting NOx compounds changes from negative to positive. Exhaust gas produced by an internal combustion engine varies in temperature up to approximately 649° C. (1200° F.). Thus the discharge produced by power supply 308 must be adjusted such that the temperature rise produced by the discharge increases the gas temperature by no more than 204° C. (400° to 600° F.).

Figure 2:
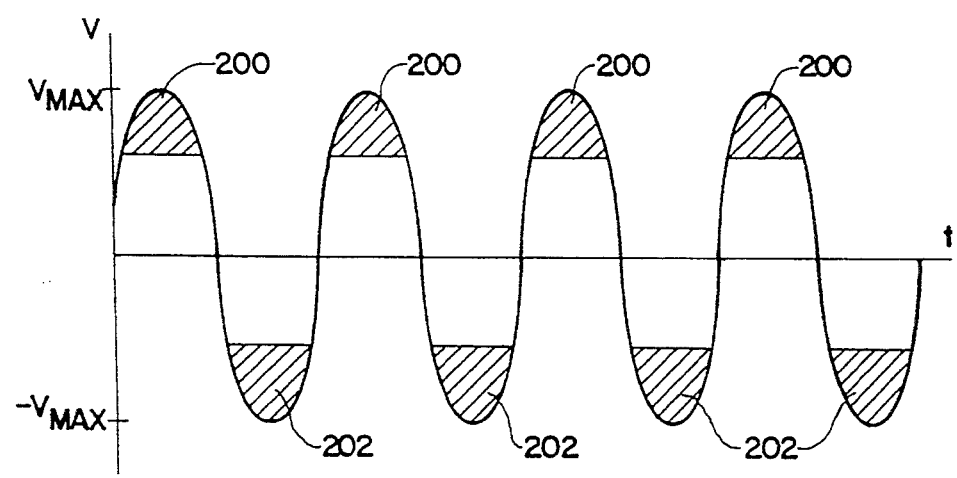
FIG. 2 shows an illustrative voltage waveform of the alternating current discharge voltage showing areas where the discharge occurs.

As shown in FIG. 2, the voltage output of the high-voltage alternating current power supply 308 generally has sinusoidal voltage which varies between a positive maximum voltage $v_{max}$ and a negative voltage, $-v_{max}$. The invention is not limited to sinusoidal waveforms and will operate with any alternating current waveform. Since an electrical discharge occurs only when the voltage difference between chamber 300 and insulator structure 302 rises above the ionization potential of the treated gas, a discharge will only occur in the shaded area 200 when the positive voltage difference exceeds the ionization potential, and in the shaded voltage area 202 when the negative voltage difference exceeds the ionization potential. Since the gas flows through chamber 300, the length 314 of chamber 300 and the frequency of power supply 308 must be adjusted based on the flow velocity in order to assure that the treated gas is subjected to a plurality of discharge cycles 200 and 202. Preferably, the length 314 of chamber 300 and the frequency of power supply 308 should be adjusted such that the treated gas is subjected to at least eight half-cycles 200 and 202 on its passage through chamber 300. Thus, because a typical exhaust gas flow velocity from an internal combustion engine can reach 6096 cm/second (200 feet/second), if the gas passes through a treatment chamber having an effective length of 91.44 cm (3 feet), the treatment time is about 15 milliseconds. The frequency of the power supply should therefore be higher than that typically used in the past, at or above approximately 300 Hz, to assure proper gas treatment. In practice, the frequency of power supply 308 will be on the order of 400 Hz to 40,000 Hz.

With the present invention, gases from actual combustion sources may be treated with a commercially reasonable residence time of on the order of 15 milliseconds (i.e., within about an order of magnitude of 15 milliseconds, and including 10–30 milliseconds, 5–45 milliseconds, 3.5–60 milliseconds, 2–75 milliseconds, 1.5–90 milliseconds, etc., but well below about one second or four seconds or above, etc., found in certain prior art systems). Other suitable residence times include from 1 to 200 milliseconds, depending upon the application.

Figure 3:
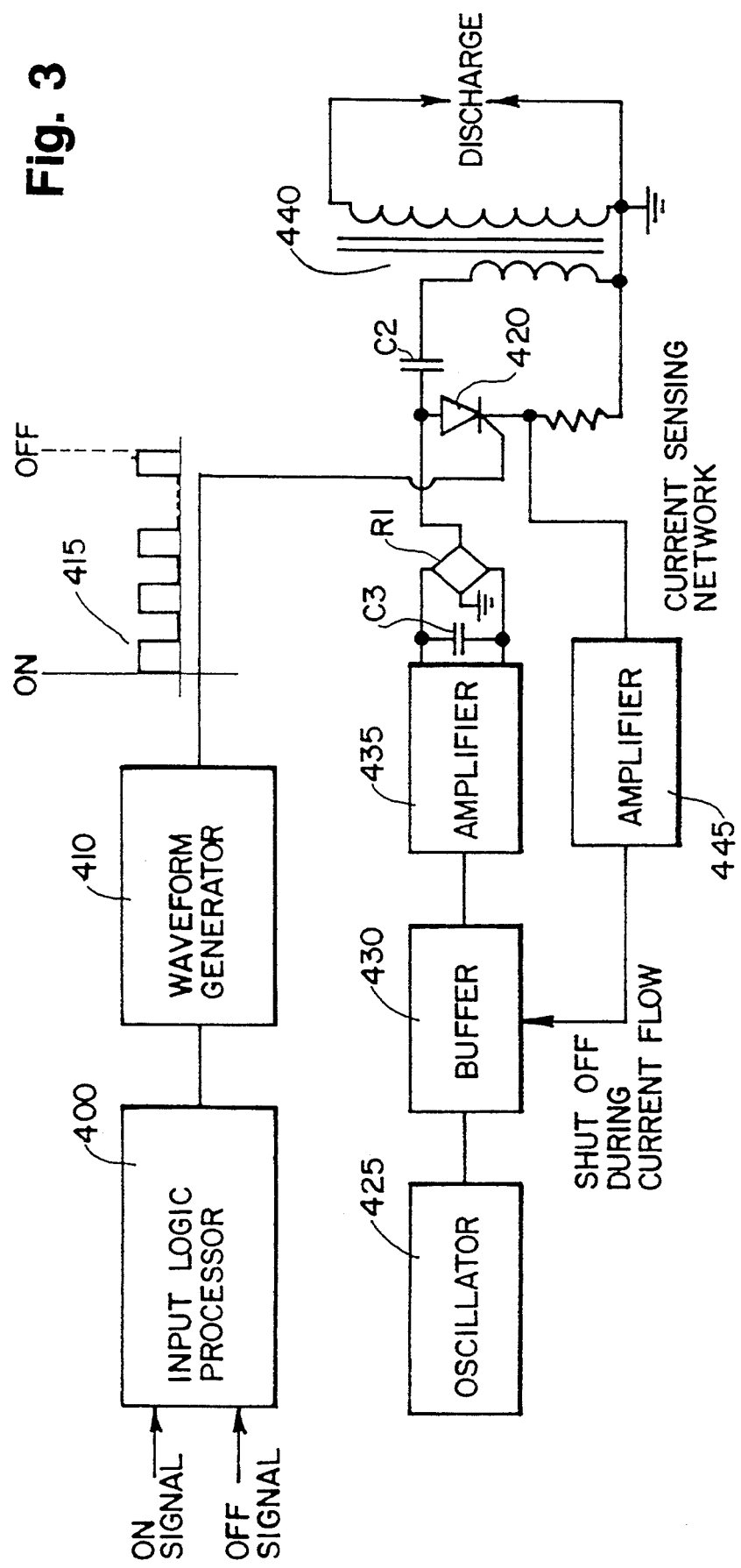
FIG. 3 illustrates an embodiment of a driving circuit that may be used in the present invention.

An alternative driving circuit for utilization in the system of FIG. 1 is illustrated in FIG. 3 (this driving circuit may be used instead of power supply 308 of FIG. 1). In embodiments utilizing this driving circuit, discharge producing signals having a combination of frequencies, including signal components of a damped sinusoidal character, are utilized to generate the desired discharge in treatment chamber 300. ON and OFF signals may be generated by any suitable control circuit, which preferably may be a digital logic or microprocessor-based control circuit. As described below, in response to the ON and OFF control signals, driving waveforms are applied to the electrodes in treatment chamber 300.

The control signals are amplified and sharpened in input logic processor 400, which turns on waveform generator 410 to produce waveform 415. Waveform 415 is applied to the gate of SCR 420, which acts as a switch to discharge capacitor C2. Capacitor C2 is charged in the preferred embodiment to a high DC voltage by the rectified output of the circuit consisting of oscillator 425, buffer 430, and amplifier 435, which are normally on. When SCR 420 conducts, a voltage is sensed due to the current that flows in the circuit comprising SCR 420, capacitor C2, and the primary of coil 440, which may be of a design of a standard ignition coil. This voltage is amplified by amplifier 445 and acts to turn off buffer 430.

When the voltage in waveform 415 is LOW, SCR 420 does not conduct and oscillator 425, buffer 430, and amplifier 435 again function at full power to recharge capacitor C2 which may be conducted in an oscillatory manner so that it can be discharged again when the gate of SCR 420 is turned on by the succeeding HIGH voltage platform of waveform 415. Oscillator 425 runs continuously at a frequency between about 18 and 100 kilohertz, and in preferred embodiments is about 90 kilohertz.

The embodiment illustrated in FIG. 3 has the advantage of instant cut off and instant restart of the circuit comprising oscillator 425, buffer 430, amplifier 435, resulting in a fast recharge of capacitor C2. Because oscillator 425 runs continuously, there is no delay in start up, as there is would be, for example, when using self-excited inverters. Another advantage of this embodiment is that the turn-off and turn-on is accomplished at low power levels in the buffer stage, allowing all controls to be at low power using TTL and CMOS logic elements.

Figure 4A:
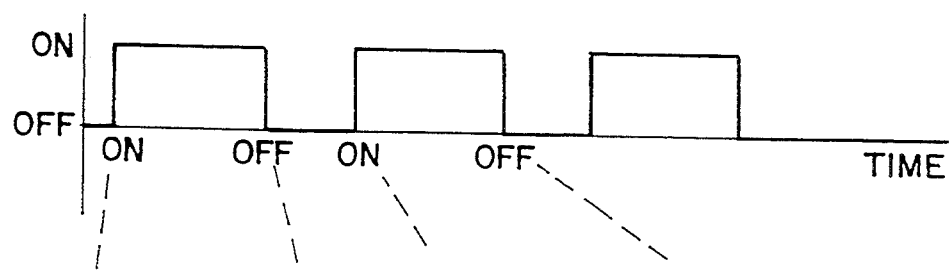
FIGS. 4A to 4C illustrate general voltage waveforms that may be produced using the driving circuit illustrated in FIG. 3.
Figure 4B:
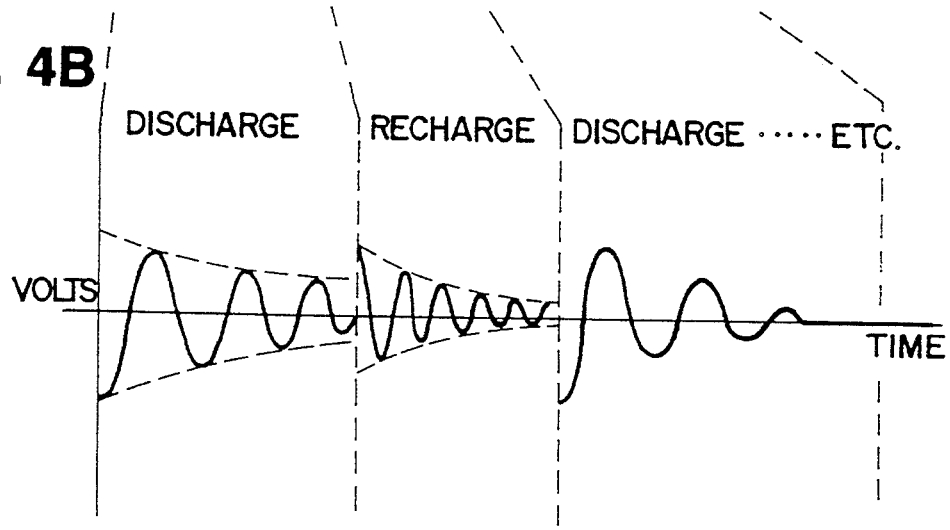
Figure 4C:
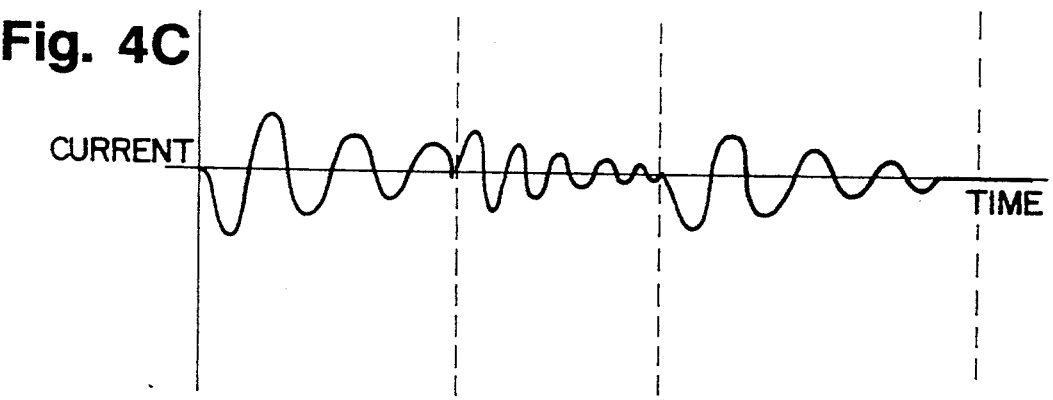

An exemplary output waveform produced by the circuit of FIG. 3 is generally illustrated in FIGS. 4A to 4C. As illustrated, the waveform produced may be a chain of exponentially decaying sinusoids produced upon discharge of capacitor C2, followed by an oscillatory waveform produced during periods when capacitor C2 is being recharged in an oscillatory manner, in general. The circuit of FIG. 3 in particular generates a recharge waveform of a positive-biased ac waveform, although this level of detail is not expressly shown in FIG. 4 (the voltage on capacitor C2 would be expected to be an increasing dc level on which is present an ac component). The rather continuous waveform, consisting of a train of oscillatory discharges and recharges, may be suitably utilized to provide a multiple frequency discharge in treatment chamber 300.

Waveforms that may be generated by this embodiment of the present invention will now be discussed in greater detail with reference to waveforms of FIG. 4B and FIG. 4C, which illustrate that, in the time interval between the oscillatory discharges of capacitor C2 in FIG. 3, produced by platforms 415, the current that recharges capacitor C2 also passes through the primary of coil 440. This rectified but unfiltered DC current, having high frequency AC components generated by amplifier 435 of FIG. 3 (the frequency content of which may be suitably controlled by the selection of oscillator 425 and filtering components for the output thereof, if any), also has an oscillatory component that can be made to produce an additional discharge in treatment chamber 300 during oscillatory recharge of capacitor C2. It should be noted that the frequency components of the oscillator recharge depend primarily from the output of amplifier 435, and thus, in general, are of a frequency unrelated to and different from the resonance frequency during discharge. Examples of such frequencies that may be preferably utilized in the present invention as the oscillator frequency range from 10 Hz to 2 MHz, with preferred ranges of around 1 KHz to 60 KHz, and from 6 KHz to 24 KHz, and from 9 KHz to 16 KHz or 18 KHz, with the particular frequencies utilized for the particular application dependent upon the transfer characteristics or the ignition coil as well as the capacitive and resonance characteristics of treatment chamber 300. It should be further noted that the waveforms of FIG. 4 are generalizations of the more complex waveforms actually produced, which may include, for example, other frequency components and/or harmonics. In the preferred embodiment, the frequencies utilized for capacitive recharge (which may consist primarily of harmonics of the oscillator frequency) are controlled to be greater than the frequency of the capacitive discharge.

In any event, oscillatory discharges and recharges of capacitor C2 induce oscillatory voltages across the primary of ignition coil 440 (such as shown in the waveform of FIG. 4B), and correspondingly induce oscillatory discharges in treatment chamber 300 (such as shown in waveform of FIG. 4C).

The high frequency components from amplifier 435 may be desirably generated, for example, by filtering the output of amplifier 435 with suitable capacitor C3 connected as shown in FIG. 3. With a nearly ideal square wave output from amplifier 435, bridge rectifier R1 produces a DC signal with little AC components. With capacitor C3, however, higher harmonics may be removed from the square wave output of amplifier 435, thereby resulting in a significant AC signal component being produced on the output of rectifier R1. Alternatively, with suitable components selected for oscillator 425, buffer 430 and amplifier 435, and suitable control circuitry, the duty cycle of the signal output from amplifier may be controlled to be other than the 50% duty cycle for the ideal square wave, which also will result in significant AC signal components being produced on the output of rectifier R1. Other methods for generating suitable AC components will be apparent to those skilled in the art, and such other methods may also be suitably utilized to generate an oscillatory discharge in treatment chamber 300.

Thus, the embodiment of the driving signal generator illustrated in FIG. 3 also can be made to produce oscillatory discharges in treatment chamber 300 as illustrated by waveforms of FIG. 4B and FIG. 4C both during discharging as well as recharging of capacitor C2. The use of the discharging as well as the recharging current significantly extends and lengthens the duration of the discharge cycle, while also allowing a controllable train of various frequency discharges including damped sinusoidal discharges to be produced in treatment chamber 300. A driving circuit such as shown in FIG. 3 is illustrated in co-pending Application Ser. No. 07/761,682, assigned to the assignee of the present invention, which is hereby incorporated by reference.

As an example of the flexibility that such a driving circuit may provide, ON and OFF pulses may be generated at a first frequency, with the first frequency selected so that a controlled number of damped sinusoidal cycles may occur (i.e., such as 1, 2, 3 or 4, etc.). Thus, a controlled number of damped sinusoidal cycles may be controllably produced before switching SCR 420 to begin oscillatory recharge of capacitor C2. The oscillatory discharge of capacitor C2 will have a frequency determined by the characteristics of the circuit in which it connected, and in general may be configured to have a desired second frequency. The oscillatory recharge of capacitor C2 may be conducted using a third frequency (or combination of frequencies). In addition, duty cycles of the ON and OFF pulses of waveform 415 may be varied (e.g., about 60% discharge and 40% recharge; about 50% discharge and 50% recharge; about 40% discharge and 60% recharge, etc.).

Additional elements also may be added to the disclosed device to further enhance its pollution reducing effectiveness. For instance, one electrode in the device may be coated with a catalyst to enhance its ability to reduce NOx emissions. In one illustrative example, the wall 301 of chamber 300 is made of steel and a catalyst plating 320, which preferably comprises rhodium but may comprise platinum or nickel, is applied to its inside surface. An alternative embodiment would be to make the walls 301 of chamber 300 of nickel, which itself is a catalyst. With such an arrangement, the catalyst would not cause the undue back pressure or pressure drop which current catalyst systems are known to create. In addition, a catalyst applied in this manner would not become poisoned because it would continuously be cleaned by the plasma.

In another pollution reducing enhancement, a high intensity ultraviolet light source, such as a circular source 322, can be located outside one or both ends of the chamber 300 so as to irradiate the gas as it flows through the chamber. When an ultraviolet light source 322 is used, the end 303 of chamber 300 should be a material transparent to ultraviolet light, such as fused quartz. A reflector 324 can also be added at the end of the chamber 300 to enhance the radiation placed into the chamber. Although not shown in FIG. 1, the ultraviolet light source can be placed at both ends of chamber 300 if desired. Ultraviolet light is known to reduce NOx emissions. In one test of the disclosed system using ultraviolet light, NOx emissions were reduced an additional twenty percent.

An exhaust gas treatment system has been constructed in accordance with the embodiment shown in FIG. 1. Treatment chamber 300 was a cylindrical steel tube which had an overall length of 121.92 cm (4 feet) and an effective length 314 of 91.44 cm (3 feet) and a diameter of 12.7 cm (5 inches). Structure 302 had a diameter of 8.89 cm (3.5 inches) and was constructed of fused quartz. Inlet and outlet pipes 310 and 312 were 8.89 cm (3.5 inches) in diameter. Power supply 308 was adjusted to produce a 3300 Hz alternating current output with an output voltage of 60 kilovolts. The voltage of power supply 308 was adjusted such that the temperature of the exhaust gas, including the increase due to the discharge, remained below 871° C. (1600° F.) and the power applied was approximately 60 watts.

An experimental model of the exhaust gas treatment system was connected to receive exhaust from one cylinder of an L-10 ® diesel engine manufactured by the Cummins Engine Company, Columbus, Indiana (L-10 ® is the registered trademark of the Cummins Engine Company). Table I below shows the hydrocarbon and NOx emissions as measured by the Cummins Technical Center of Columbus, Indiana at the output 312 of the treatment system without high-voltage supply 308 operating.

TABLE I

| Hydrocarbons | 205 ppm. |
| --- | --- |
| NOx | 597 |
| RPM | 732 |

TABLE II

| Hydrocarbons | 113 ppm. |
| --- | --- |
| NOx | 369 |
| RPM | 732 |

Although an embodiment of the invention has been illustrated and described, it is anticipated that various changes and modifications, including, without limitation, multiple electrodes, will be apparent to those skilled in the art, and that such changes may be made without departing from the scope of the invention as defined by the following claims:

What is claimed is:

1. A method for reducing pollutants including NOx compounds in a moving fluid produced by a combustion source, said method comprising the steps of:

providing a closed treatment chamber having a length and an input and output and an open interior portion for flow of said moving fluid and comprised of a conductive material to make said treatment chamber a first electrode;

providing a dielectric insulating element within said treatment chamber;

placing within said dielectric insulating element conductive material to create a second electrode;

generating an alternating current electric field between said first and second electrodes in the interior portion of said treatment chamber, the alternating current electric field comprising a series of damped sinusoidal waveforms;

directing said moving fluid through the interior portion of said treatment chamber and said electric field, wherein the fluid in the treatment chamber has a residence in the range of about 1 to 200 milliseconds; and adjusting the frequency and strength of said electric field so that a dielectric discharge occurs while said field strength remains low enough that the temperature of said moving fluid remains in a temperature range of lower than about 1800° F.

2. A method for reducing pollutants, including NOx compounds, in a moving fluid produced by a combustion source in a closed treatment chamber having a length and an open interior portion for flow of said fluid and at least one pair of electrodes separated by an insulator, said method comprising the steps of:

directing said fluid through the interior portion of said chamber;

applying an alternating current electrical field across said electrodes to cause a dielectric discharge to occur between said electrodes and in the interior portion of said chamber, said field having a frequency and a strength low enough that the temperature of said fluid remains in a temperature range of lower than about 1800° F., said field including a plurality of frequency components including a damped sinusoid of a first frequency and an oscillatory signal of a second frequency; and adjusting said treatment chamber length and said alternating current frequency such that said fluid is subjected to at least eight half-cycles of said discharge while in said treatment chamber.

3. The method according to claim 2, wherein said first electrode comprises said treatment chamber, and said second electrode comprises an electrical conductor located inside a dielectric insulator placed within said treatment chamber.

4. The method according to claim 3, wherein a portion of the inside of said treatment chamber comprises a catalyst.

5. The method according to claim 2, further including the step of positioning an ultraviolet light source such that said moving fluid passes through the light emitted from said light source.

6. An apparatus for reducing pollutants, including NOx compounds, in a moving fluid produced by a combustion source, said apparatus comprising:

a treatment chamber having an inlet and an outlet and an open interior portion through which said moving fluid passes and comprised of a conductive material to form a first electrode;

a tubular element within said treatment chamber positioned such that said moving fluid passes between said tubular element and said first electrode, said tubular element comprising a dielectric insulating material and having a conductive material located within said tubular element to form a second electrode;

means for generating an alternating current electrical field between said first and second electrodes in the interior portion of said treatment chamber, the electrical field having a strength high enough that a dielectric discharge occurs between said electrodes, and low enough that the temperature of said moving fluid remains in a temperature range of lower than about 1800° F., the electrical field comprises a train of waveforms, said train of waveforms comprising a damped oscillatory signal.

7. An apparatus according to claim 6, wherein a portion of said treatment chamber comprises a catalyst.

8. An apparatus according to claim 6, further including an ultraviolet light source positioned such that said moving fluid passes through the light emitted from said light source.

9. A method for reducing pollutants including NOx in a gas produced by a combustion source comprising the steps of:

flowing the gas through an open treatment zone defined by first and second electrodes, the first electrode being covered by an insulator;

generating a cyclically varying electric field between the first and second electrodes so as to subject the gas to a plurality of cycles of the varying electric field, the varying electric field having a strength high enough to create a dielectric discharge between the first and second electrodes and low enough that the temperature of the gas remains in a temperature range of lower than about 1800° F., the varying electric field comprising a series of damped oscillatory waveforms.

10. The method of claim 9 further comprising the step of subjecting the gas to ultraviolet radiation as the gas flows through the treatment zone.

11. The method of claim 10 wherein the ultraviolet radiation is directed towards an ultraviolet radiation reflective surface.

12. The method of claim 9 wherein the second electrode includes a catalytic surface, wherein the catalytic surface comprises rhodium, platinum or nickel.

13. A method for reducing pollutants including NOx in the exhaust gas of a diesel engine comprising the steps of:

flowing the exhaust gas through an open treatment zone defined by first and second electrodes, the first electrode being covered by an insulator;

generating a cyclically varying electric field between the first and second electrodes so as to subject the exhaust gas to a plurality of cycles of the varying electric field, the varying electric field having a strength high enough to create a dielectric discharge between the first and second electrodes and low enough that the temperature of the exhaust gas remains in a temperature range of lower than about 1800° F., the varying electric field comprising a series of damped oscillatory waveforms.

14. The method of claim 13 further comprising the step of subjecting the exhaust gas to ultraviolet radiation as the gas flows through the treatment zone.

15. The method of claim 14 wherein the ultraviolet radiation is directed towards an ultraviolet radiation reflective surface.

16. The method of claim 15 wherein the second electrode includes a catalytic surface, wherein the catalytic surface comprises rhodium, platinum or nickel.

* * * * *